United States Patent Office 3,434,545
Patented Mar. 25, 1969

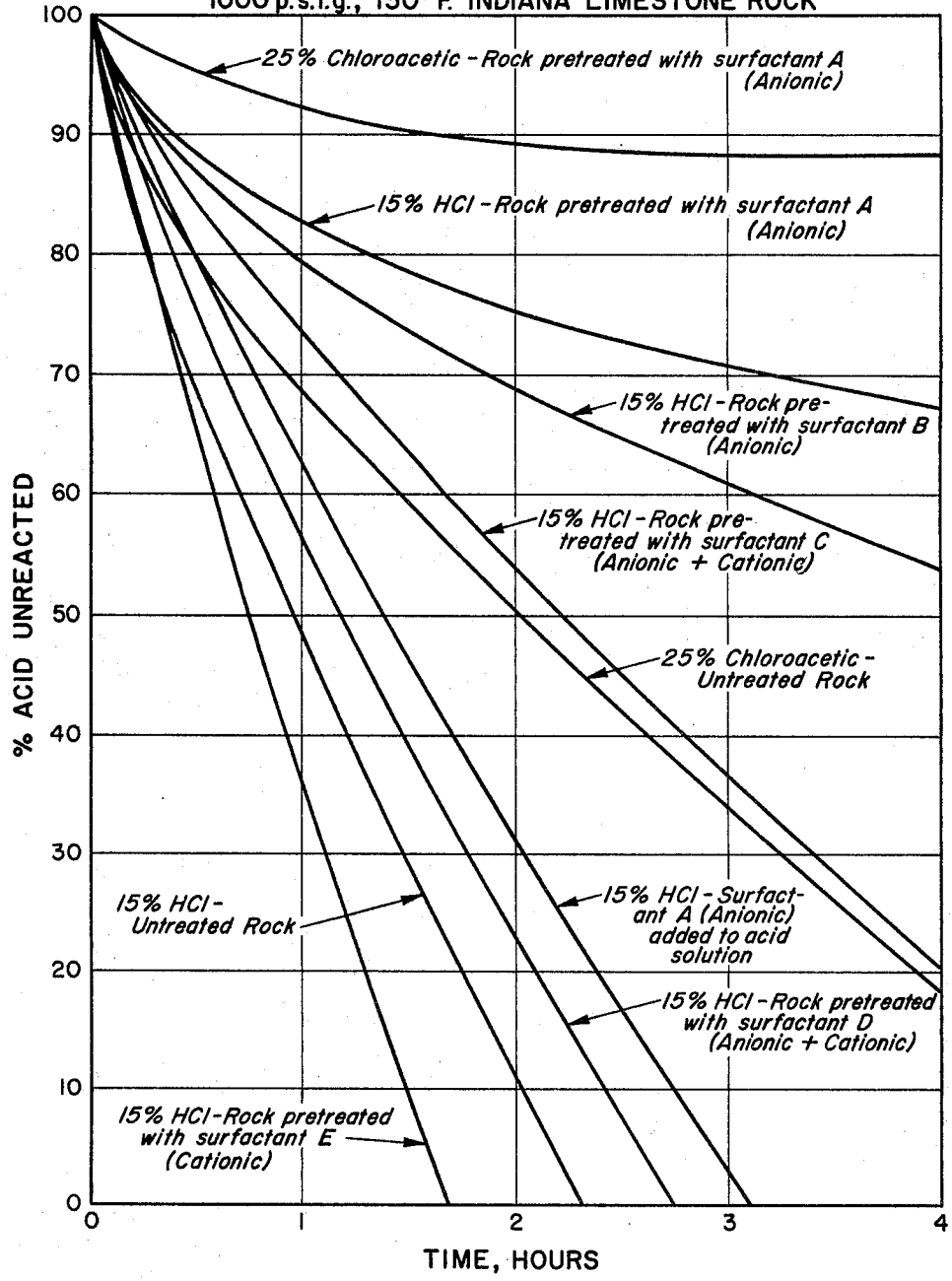

3,434,545
ACID TREATING SUBTERRANEAN FORMATIONS
Caurino C. Bombardieri, Calgary, Alberta, Canada, assignor to Esso Production Research Company, a corporation of Delaware
Filed Dec. 27, 1966, Ser. No. 604,770
Int. Cl. E21b *43/27, 43/22*
U.S. Cl. 166—307
15 Claims

ABSTRACT OF THE DISCLOSURE

An acid treating process in which a surface active agent is injected into a subterranean formation surrounding a fluid injection or production well, the surfactant is followed with a hydrocarbon oil, the injected fluids are held in the formation for an extended period, and an acid solution is thereafter injected into the formation behind the oil.

BACKGROUND OF THE INVENTION

*Field of the invention*

This invention relates to the injection of acids into subterranean formations surrounding fluid injection or production wells and is particularly concerned with the use of surface active agents to alter the reaction rate of acids injected into carbonate formations.

*Description of the prior art*

Acid solutions are often employed to improve the permeability and porosity of carbonate formations containing crude oil and natural gas. Experience has shown that the improvements obtained are generally limited to the first few inches of the formation. Only spent acid reaches more remote sections of the reservoir. To secure greater penetration, it has become common practice to use chemically retarded acids. These are normally solutions of hydrochloric acid containing anionic surface active agents which are adsorbed on the rock surfaces during the acid injection. It has been found that these retarded acids give better results than are generally obtained in the absence of surface active agents but that premature reaction of the injected acid is still a problem.

SUMMARY OF THE INVENTION

It has now been found that the pretreatment of a carbonate formation surrounding a fluid injection or production well with an anionic surface active agent and a hydrocarbon oil and the subsequent injection of an acid solution after the well has been shut in for an extended period results in considerably greater retardation of the acid than if the surfactant is injected with the acid solution. The surface active agent and hydrocarbon oil apparently form a strongly adherent oil film wherever the hydrophilic portion of the surfactant is adsorbed on the formation and the lithophilic portion is exposed. This oil film evidently restricts diffusion of the hydrogen ions to the rock surface and thus protects it against the acid. The unspent acid solution, therefore, penetrates deeply into the formation so that improvements in permeability and porosity can be obtained at points remote from the wellbore.

If a cationic or nonionic surface active agent is used in place of an anionic surfactant, the reaction of the acid with the carbonate is accelerated, apparently because the surfactant removes reservoir oil from the formation and exposes the rock surfaces. This may be advantageous for overcoming damage at the face of the formation. The use of a mixture of an anionic and a cationic or nonionic surface active agent results in retardation of the acid reaction at points where the anionic compond is adsorbed on the rock surface and an acceleration of the reaction at other points. This produces a highly etched rock surface. The use of such a mixture of surfactants has particular advantages in hydraulic fracturing operations, in acidizing naturally fractured reservoirs, and in cases where the permeability of the formation adjacent the wellbore is especially low.

BRIEF DESCRIPTION OF THE DRAWING

The drawing is a plot showing the results of experiments in which limestone samples were treated with acid solutions, with and without the use of surface active agents. The curves show the effect of adding surface active agents to the acid solutions and of pretreating the rock with surface active agents prior to contacting it with the acid solutions.

DESCRIPTION OF THE PREFERRED EMBODIMENTS

In carrying out the invention, the procedure employed will depend in part upon the initial condition of the well to be treated. If perforations are plugged or the formation has been damaged by mud solids, paraffin, scale or other foreign matter accumulated during drilling, completion or production operations, it is often advisable to employ a preliminary acid treatment prior to the matrix acidizing step. The well is generally killed by injecting sufficient crude oil to prevent the entry of fluids from the formation into the wellbore. This initial step can be omitted in the case of water injection wells and production wells that have ceased to produce connate fluids. Sucker rods and other equipment are removed from the wellbore. The accumulated wax and other foreign material may be scraped from the casing or face of the formation by means of a mechanical scraper or similar device. The wellbore is then filled with crude oil, water or brine, depending on the nature of the formation to be treated. About five to ten barrels of acid solution is pumped into the well through a string of tubing while fluid displaced by the acid is discharged from the casing head. It is preferred to use a solution of 15% hydrochloric acid but other acids are suitable. A cationic or nonionic surface active agent may be included to accelerate the action of the acid if desired. Following injection of the acid solution, with or without a surfactant, the well is normally shut in for several hours and then back-flowed to remove the spent acid. The action of the acid will generally reopen any closed perforation and overcome any damage at the face of the formation. Where no evidence of plugging or formation damage exists, the preliminary acid treatment may be omitted.

Before injecting the surface active agent and hydrocarbon oil employed for matrix acidizing purposes, it is often advantageous to remove excess water or brine from around the wellbore. This can be done by injecting from about five to ten barrels of a low molecular weight alcohol or similar fluid miscible with oil and water. Isopropyl alcohol is generally used. Any alcohol or water remaining in the formation after this treatment can be displaced by injecting from about five to fifteen or more barrels of a hydrocarbon oil. Lease crude oil is normally employed if available but kerosene, heating oil and other petroleum fractions can be utilized. If only moderate quantities of water or brine are present, the oil may be employed without the alcohol or other fluid. The oil preflush improves the wetting action of the surface active agent in the vicinity of the wellbore and is particularly helpful if the formation has a low oil saturation.

In formations where the permeability is particularly low, it is also advantageous in some cases to inject a spearhead of water into the formation under sufficient pressure to fracture the rock or open natural fractures prior to the matrix acidizing operation. This is often more effective than fracturing with an acid solution because it permits more rapid entry of the acid into the natural or induced fractures and thus results in greater penetration of the acid before it becomes spent.

The surface active agent employed in accordance with the invention may be an oil wetting anionic surfactant or a mixture of such an anionic compound with cationic or nonionic surfactants. Oil soluble, water dispersible compounds are preferred. A variety of different surfactants marketed for use in treating oil and gas wells are suitable. Examples of surfactants having anionic functional groups that may be used include sodium tetradecyl sulfate, sodium heptadecyl sulfate, sodium di (2-ethyl-hexyl) phosphate, sodium 2-ethylhexyl sulfate, sodium dioctyl sulfosuccinate, sodium dihexyl sulfosuccinate, sodium diamyl sulfosuccinate, N-octadecyl disodium sulfosuccinate, sodium isopropyl naphthalene sulfonate, sodium alkyl aryl polyether sulfates, sodium alkyl aryl sulfonates, sodium salts of alkyl esters of ethylene sulfite, and mixtures of such agents.

Cationic surface active agents which may be used in conjunction with the anionic surfactants include alkyl benzyl trimethyl ammonium chlorides, substituted oxazolines, fatty acid imidazolines, acetic acid salts of fatty amines, alkyl triethyl ammonium chlorides, dialkyl dimethyl ammonium chlorides, alkyl trimethyl ammonium chlorides, polyoxyethylene condensates of alkyl amines, polyoxyethylene condensates of soybean amines, phenoxy trialkyl benzyl ammonium chlorides, alkyl tolyl trimethyl ammonium chlorides, alkyl dodecyl benzyl trimethyl ammonium chlorides, diisobutyl phenoxyethoxyethyl diethyl benzyl ammonium chlorides, tertiary alkyl tetraethoxyethanol amines, and the mixtures of such agents.

The nonionic surface active agents which may be present in the surfactant mixtures include nonyl phenol ethylene oxides, trimethyl nonanol ethylene oxides, polyalkylene glycol ethers, alkyl aryl polyether alcohols, polyoxyethylenes, polyoxypropylenes, alkyl phenoxy ethyleneoxide ethanols, polyoxyethylene sorbitan monolaurates, polyoxyethylene sorbitan monopalmitates, polyoxyethylene sorbitan monostearates, polyoxyethylene lauryl ethers, polyoxyethylene oleyl ethers, polyoxyethylene palmitates, and the like.

The surface active agents are preferably employed in concentrated form. Many surfactants are marketed as oil, water or alcohol-water solutions containing from about 10 to about 80% by weight of the active ingredient and can be used as obtained from the manufacturer or distributor. This is particularly true in the case of surface active agents marketed specifically for oilfield applications. Other materials are sold as liquids, pastes or solids which have to be dissolved or diluted with a suitable solvent before being used. In general, surfactant solutions with concentrations of from about 20 to about 50% by weight are preferred.

The quantity of surfactant solution employed will depend upon the size of the acid treatment desired. Tests have shown from about 1 to about 5 barrels of concentrated surfactant solution containing from about 40 to 60% of the active ingredient in an oil or water base solvent per 1000 gallons of acid is generally satisfactory. If a solution containing the surface active agent in somewhat lower concentrations is used, greater quantities of the solution may be required for best results. In general, from about 1 to about 2 barrels of concentrated surfactant solution per 1000 gallons of acid solution is preferred.

The surfactant solution is employed by injecting it into the well and surrounding formation to displace the previously injected oil, water and other fluids, if any. This is then followed with from about 10 to about 40 barrels of oil per 1000 gallons of acid solution. Again the oil used will normally be a lease crude oil but may be a refinery cut such as a heating oil, lubricating oil, or the like. Lease crudes are generally preferred. After the surfactant solution and oil have been injected into the formation, the well is closed in and allowed to stand for a period of from about 2 hours to about 24 hours. A period of from about 3 to about 8 hours is preferred. During this period, the anionic surfactant molecules tend to be adsorbed on the formation surfaces with the lithophilic groups exposed. The oil injected behind the surface active agent solution aids in dispersing the solution throughout the reservoir rock and leads to the formation of an oil-wet film wherever the lithophilic portion of the anionic compound is exposed. This oil-wet film is strongly adsorbed to the surface of the rock. Nonionic and cationic compounds, if present, prevent the effective formation of such a film at certain points in the formation. By properly selecting the surfactants used, the extent of film formation can thus be partially controlled. The anionic compound should be the major constituent in the surfactant solution.

At the end of the shut-in period, the acid solution employed for matrix acidizing purposes is injected into the formation containing the previously injected surfactant solution and oil. Any of a variety of different acids may be used. Hydrochloric acid of about 15% concentration is generally employed but other mineral acids, organic acids, or acid mixtures are sometimes preferred. Acetic acid, chloroacetic acid, propionic acid, and mixtures of formic or chloroacetic acid with acetic, hydroxyacetic propionic or citric acid are particularly effective. The acid solutions used will normally contain a corrosion inhibitor such as sodium mercaptobenzothiazol, triethanolamine phosphate, phenyl hydrazine, an alkali metal arsenate or the like and may include an anionic, cationic or nonionic surface active agent or demulsifier. Certain surfactants function both as corrosion inhibitors and demulsifiers when employed in the proper concentrations and are therefore particularly effective. In some cases, it may also be desirable to include thickening agents in the acid solutions, particularly where the reservoir is to be fractured as a part of the overall treating operation. Thickening agents which will temporarily increase the viscosities of acid solutions sufficiently to permit their use as fracturing fluids and will thereafter lose their viscosity increasing properties have been suggested in the prior art. The acid solution selected and the additives employed therein, if any, will depend upon the circumstances under which the treating operation is to be carried out. The quantity of solution employed may range from a few hundred gallons up to a thousand gallons or more, depending upon the thickness of the formation to be treated, the permeability of the formation, and other factors.

The acid solution is pumped into the well from a tank truck in the conventional manner. After fluid equivalent to the tubing volume has been displaced with acid, the wellhead is closed and pumping is continued to force the solution outwardly into the formation. The oil film on the formation surfaces retards reaction of the acid with the underlying carbonate material and thus permits unreacted acid to penetrate substantial distances into the formation. Where the formation is exposed, the reaction of the acid with the carbonate rock takes place readily. The use of a mixture of anionic and cationic or nonionic surfactants in the pretreatment thus results in a pronounced etching of the formation. After the acid solution has been injected into the formation, the well is normally shut-in and allowed to stand for a period ranging from several hours to a day or more. The pressure on the well is then released and the spent acid solution is permitted to flow back into the wellbore and returned to the surface. The well is thereafter placed on production or employed for other purposes. It will be understood that the acidizing process may be employed for improving the permeability of carbonate formations surrounding both injection and production wells. Low permeability surrounding injection wells employed in oil recovery operations limits the injecton of water, gases and other fluids into the formations and is often a serious problem. By acidizing such wells, improved injectivity can often be obtained.

The nature and object of the invention are more fully illustrated by the results of tests carried out to determine the reaction rates of 15% hydrochloric acid on limestone under various conditions. The samples employed were cylinders 1¼" in diameter and 1½" in length cut from Indiana limestone. These cylinders were saturated with an oilfield brine and then flushed with crude oil prior to acid treatment. The initial test was carried out without any surface active agent. The sample was placed in a wire basket in the upper part of a reaction rate cell provided with means for controlling the temperature and pressure conditions. The acid employed was contained in the lower part of the cell. Nitrogen gas was injected in a quality sufficient to raise the pressure to 1000 lbs. per square inch gauge at a temperature of 130° F. The apparatus was then placed in an oven in the upright position and heated to 130° F. After the temperature and pressure conditions had stabilized, the holder was inverted so that the acid contacted the limestone sample. At periodic intervals, the holder was inverted and a sample of the acid was recovered for analysis. The percentage of unreacted acid after various time intervals was plotted and the results are shown in the drawing. It can be seen that the 15% hydrochloric acid reacted rapidly with the limestone and was essentially spent in less than two hours.

Following the initial test without a surface active agent, a similar sample of the same oil-saturated limestone containing residual brine was pretreated by placing it in a core holder and injecting an alcohol-water solution of an anionic hydrocarbon sulfonate marketed for use as an oilfield treating agent. This material is referred to as "Surfactant A" in the drawing. Crude oil was injected to displace the surfactant solution. The treated core thus prepared was then placed in the apparatus referred to above and contacted with a 15% solution of hydrochloric acid in the manner described earlier. Samples of the acid were withdrawn periodically and analyzed as before. As indicated on the drawing, the pretreatment of the limestone with the surfactant solution, followed by oil, significantly retarded the acid reaction rate. At the end of three hours, about 68% of the acid solution remained unreacted. The oil film formed during the pretreatment evidently shielded the rock surfaces against the acid. The exposed surfaces were only slightly etched, indicating that the film was not entirely uniform but covered substantially the entire rock surface.

In a third test, a sample of the same oil-saturated limestone was treated with a sample of the same 15% hydrochloric acid and a sample of the same anionic surface active agent employed in the earlier test. Instead of pretreating the limestone with the surface active agent and following this with crude oil, the surfactant was added to the acid solution before it contacted the limestone. The results shown in the drawing indicate that some retardation took place. The surface active agent was much less effective, however, than when used as a pretreatment and followed by crude oil.

A second series of tests similar to that described above was carried out using a solution of 25% chloroacetic acid in place of the hydrochloric acid employed earlier. Chloroacetic acid reacts with limestone more slowly than does hydrochloric acid, as can be seen from the drawing. The pretreatment of the limestone with the anionic surface active agent, followed by an oil flush, gave a significantly slower reaction rate than was obtained with either the 25% chloroacetic acid alone or the 15% hydrochloric acid. At the end of about four hours, over 85% of the 25% chloroacetic had still not reacted with the pretreated limestone. Less than 20% of the 25% chloroacetic remained unreacted after four hours where the pretreatment was not used. Only slight etching of the rock surface took place. These results show that the retardation obtained in accordance with the invention is not limited to hydrochloric acid and that the invention may be carried out with either strong mineral acids or organic acids.

Still further tests were carried out with a 15% solution of hydrochloric acid and other surface active agents. The results are shown in the drawing. Surfactant B was an anionic material similar to Surfactant A tested earlier. Pretreatment of the oil-saturated limestone rock with a concentrated solution of this material, followed by an oil flush as described earlier, retarded the reaction rate of the hydrochloric acid solution but was less effective than Surfactant A. At the end of about four hours, approximately 54% of the acid solution in contact with the rock sample remained unreacted. Again only slight etching of the rock surface occurred. Surfactant C contained both anionic and cationic functional groups. Some retardation was obtained by pretreating the rock with a solution of this material and crude oil but the results were much less pronounced than those obtained with the anionic surfactants. After four hours about 22% of the acid solution was still available for reaction. An inspection of the sample following the acid treatment showed that the rock surfaces were deeply etched during the acid treatment. The cationic constituents of the surfactant mixture apparently accelerated the acid attack at certain points; while the anionic constituents retarded it at others. This produced an irregular, deeply pitted surface much more permeable than that obtained with the anionic materials. As pointed out earlier, treatment with mixed surface active agents of this type is especially effective in cases where the permeability around the wellbore is particularly low and in acid fracturing operations. Surfactant D is a mixture of anionic and cationic constituents but is primarily cationic in nature. The reaction rate obtained with the 15% hydrochloric acid on limestone pretreated with this material and crude oil was only slightly better than that obtained with the acid on untreated rock. Here again the surface of the rock was deeply etched due to the accelerating action of the cationic constituent and had high permeability. Somewhat similar results were obtained with Surfactant E, a cationic surface active agent. The reaction rate of the acid solution was accelerated and exceeded that of the acid on untreated rock. This clearly demonstrates the effect of the cationic surface active agents and emphasizes that an anionic material or a mixture of anionic and cationic or nonionic agents should be used if retardation of the reaction rate is to be obtained. It also shows that neither anionic nor cationic agents alone produce significant etching of the rock surfaces. Results similar to those shown in the drawing have been obtained with a number of other surface active agents.

The benefits of the method of the invention are further demonstrated by the results of experimental field tests carried out in newly completed wells in two different fields. In the first field, three wells were treated. These were located adjacent to one another. Two were completed in the conventional manner by injecting acid containing an anionic surface active agent in the concentrations recommended by the service company providing the treatment. The third well was treated by first injecting a concentrated surfactant solution, following this with a bank of crude oil, and thereafter injecting the acid solution after a 4 hour shut-in period, as described earlier. The surfactant in all three cases was a petroleum sulfonate marketed for oilfield application. In each instance a 15% solution of hydrochloric acid was used. The results obtained are shown in the following table.

COMPARISON OF ACID TREATMENTS

| Well: | Method | Acid Vol., Gals. | Md. x ft. | Production, BOPD | |
|---|---|---|---|---|---|
| | | | | Initial | After 3 Months |
| A | Surfactant-acid mixture | 5,250 | 80 | 22 | [1] 9 |
| B | do | 2,500 | 94 | 58 | [1] 48 |
| C | Surfactant pretreatment, followed by crude oil, followed by acid | 1,700 | 36 | 200 | [2] 165 |

[1] Pumping.  [2] Flowing.

It can be seen from the above table that the results obtained with the pretreatment were substantially better than those where the surface active agent was added with the acid solution. The initial production from the well pretreated with the surfactant solution was nearly four times that from one of the wells in which the surfactant was added with the acid and about ten times that from the other well. This difference in the production persisted and was still evident three months later. The pretreatment evidently resulted in much better penetration of the acid and much higher permeability at substantial distances from the wellbore than could be obtained with the conventional method.

In the second field, two closely spaced wells completed in the same formation were acid treated following completion. In one case the formation was treated with 15% hydrochloric acid without any surface active agent. In the other case, a pretreatment with an anionic surface active agent and crude oil as described earlier was used. Again the well subjected to the pretreatment gave substantially higher production than the well treated in the conventional manner. At the end of three months the benefits of the pretreatment were still evident. It is therefore apparent that the pretreatment of carbonate formations with concentrated anionic surface active agents, followed by a bank of crude oil to establish an oil film on the formation, and the subsequent injection of acid gives substantially better results than can be obtained with the acid alone or acid to which a surface active agent has been added.

I claim:
1. A method for improving the permeability of a subterranean formation surrounding a well which comprises injecting a solution of a surface active agent having anionic functional groups into said formation, injecting a hydrocarbon oil into said formation behind said solution, closing in the well for a period of from about 1 to about 24 hours, and thereafter injecting an acid into the formation behind said hydrocarbon oil.
2. A method as defined by claim 1 wherein said surface active agent is a mixture of anionic and cationic compounds.
3. A method as defined by claim 1 wherein said surface active agent is a mixture of anionic and nonionic compounds.
4. A method as defined by claim 1 wherein said solution contains said surface active agent in a concentration of from about 20 to about 80 percent by weight.
5. A method as defined by claim 1 wherein said acid is an aqueous acid solution including a surface active agent.
6. A method as defined by claim 1 wherein a fluid miscible with both oil and water is injected into said formation prior to the injection of said solution of a surface active agent.
7. A method as defined by claim 1 wherein a hydrocarbon oil is injected into said formation prior to the injection of said solution of a surface active agent.
8. A method as defined by claim 1 wherein from about 1 to about 5 barrels of said solution of a surface active agent is injected into said formation for each 1000 gallons of said acid that is injected.
9. A method as defined by claim 1 wherein from about 5 to about 40 barrels of said hydrocarbon oil is injected into said formation for each 1000 gallons of said acid that is injected.
10. A method as defined by claim 1 wherein said acid comprises chloroacetic acid.
11. A method as defined by claim 1 wherein said well is closed in for a period of from about 3 to about 8 hours.
12. A method as defined by claim 1 wherein an acid is injected into said well prior to the injection of said solution of a surface active agent.
13. A method for treating a subterranean carbonate formation surrounding a well which comprises injecting a fluid miscible with oil and water into said formation, injecting a hydrocarbon oil to displace said fluid from around said well, introducing a solution of an anionic surface active agent into said formation behind said oil, injecting additional hydrocarbon oil into said formation, shutting in said well for a period of several hours, injecting an acid solution into said formation, again shutting in said well for several hours, and thereafter producing fluids from said formation.
14. A method as defined by claim 13 wherein said fluid miscible with oil and water is isopropyl alcohol.
15. A method as defined by claim 13 wherein said solution containing said surface active agent is an alcohol-water solution containing from about 20 to about 50 weight percent of an oil-soluble, water-dispersible anionic sulfonate.

References Cited

UNITED STATES PATENTS

| 3,343,602 | 9/1967 | Knox et al. | 166—42 |
| 3,251,415 | 5/1966 | Bombardieri et al. | 166—42 |
| 3,254,718 | 6/1966 | Dunlap | 166—42 |
| 3,301,328 | 1/1967 | Campion | 166—42 |

OTHER REFERENCES

Kingston, Acidizing Handbook, Gulf Publishing Company, Houston, Texas (1936) (page 34 relied on). TN 871 .K5 copy in Group 354, 166–42.

STEPHEN J. NOVOSAD, *Primary Examiner.*

U.S. Cl. X.R.

170—160.25